Aug. 6, 1968  T. S. SPRAGUE  3,395,676

VAPOR GENERATOR

Filed July 5, 1966

INVENTOR.
Theodore S. Sprague

BY

*J. P. Moran*

ATTORNEY

3,395,676
VAPOR GENERATOR
Theodore S. Sprague, Hudson, Ohio, assignor to The Babcock & Wilcox Company, New York, N.Y., a corporation of New Jersey
Filed July 5, 1966, Ser. No. 562,861
5 Claims. (Cl. 122—32)

This invention relates in general to a vapor generator and more particularly to a system for limiting the amount of fluid lost from a ruptured or leaking tube of a vapor generator utilizing a heated liquid metal or gas as a source of heat.

More specifically, the invention has application to a vapor generator using a liquid alkali metal, such as sodium, bismuth, or sodium-potassium alloy, or a gas, such as helium, as its heating fluid. Heating fluids of this character have been employed in nuclear power systems as reactor coolants and to convey heat picked up from the reactor to a heat exchanger or vapor generator to generate steam. One of the major problems associated with a liquid alkali metal-heated vapor generator is restriction of alkali metal-water contact in the event of a tube leak or rupture since appreciable leakage of water into the metal results in a violent chemical reaction. The problem presented in a gas heated vapor generator in case of tube rupture or leakage is limiting the amount of fluid carried by the gas to the reactor core. Several systems have been proposed for heat exchangers of the character described to prevent or restrict contact of the heated and heating fluids, such as double-walled tubes, but all have disadvantages in the nature of complexity and/or cost.

Thus the general object of the present invention is the provision of a simplified and relatively inexpensive system for minimizing the amount of heated fluid-heating fluid contact upon tube failure in a vapor generator of the character described. In accordance with the invention, the vapor generator comprises a pressure vessel occupied by a bank of tubes traversed by primary fluid flowing through the vessel and arranged for parallel flow of a secondary fluid therethrough in indirect heat absorbing relation with the primary fluid. For the eventuality of a tube failure, provisions are made for cutting off fluid supply to the tubes, for reversing the direction of fluid flow in the tubes, and for draining the tubes upon such flow reversal. In addition, a flow resistor is installed in the inlet and outlet of each tube. Each tube inlet resistor is proportioned and arranged to provide a substantial secondary fluid pressure drop in the normal secondary fluid flow direction to promote stable and uniform flow through the tubes and a relatively low pressure drop in the reverse flow direction to permit rapid drainage of the tubes in the event of tube failure; while each tube outlet resistor is proportioned and arranged to provide a relatively low fluid pressure drop in the normal secondary fluid flow direction and a substantial secondary fluid pressure drop in the reverse flow direction in the event of tube failure to minimize fluid flow in the direction of the tube fault.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive mattter in which there is illustrated and described a preferred embodiment of the invention.

Figure 1:
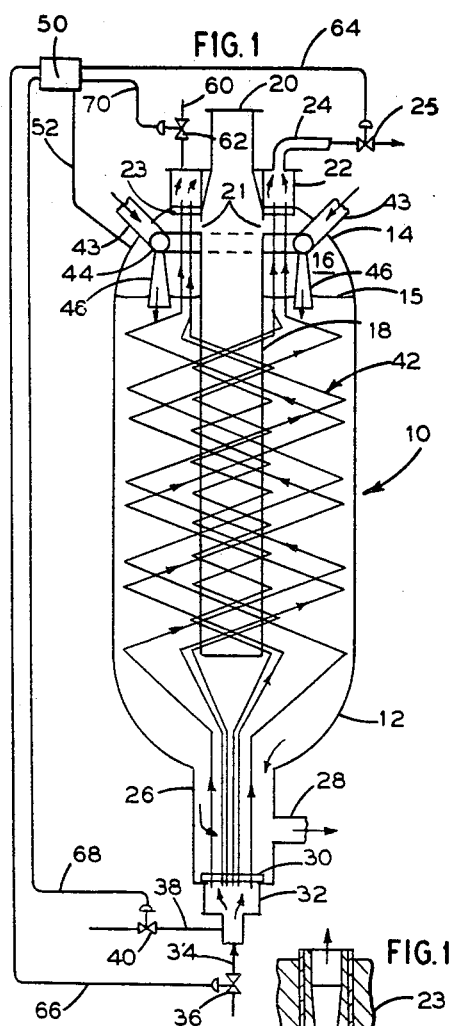
FIG. 1 is a schematic illustration of a vapor generator embodying the invention and indicating the normal heated fluid flow path.

FIG. 1 shows a vapor generator comprising an upright cylindrical pressure vessel 10 formed at its opposite ends with generally hemispherically shaped heads 12 and 14 and containing a body of sodium 15 below an upper argon gas space 16. Space 16 is suitably supplied with argon gas to maintain a positive inert atmosphere over the liquid sodium and thus prevent sodium oxidation. Vessel 10 is occupied by an upright concentric tubular conduit 18 closed at its lower end and having an upper portion extending through head 14, closed by a rupture disk 20 and formed with openings 21. The upper part of head 14 is formed with an annular stream outlet chamber 22 enclosing and connected to conduit 18 and provided at its bottom with a tube sheet 23, with a steam outlet conduit 24 opening into the upper portion of chamber 22 and containing a control valve 25. An upright cylindrical chamber 26 is connected to head 12, opens to the lower portion of vessel 10, is provided with a sodium outlet conduit 28 intermediate its height, and is fitted at its bottom with a tube sheet 30 forming the upper portion of an upright cylindrical feedwater inlet chamber 32. Chamber 32 is connected for supply of feedwater from a pump, not shown, by way of a conduit 34 containing a control valve 36; and is provided with a drain conduit 38 controlled by a valve 40 and leading to a dump tank, not shown.

Vessel 10 is also occupied by a bundle of tubes 42 helically wound about conduit 18 in a manner similar to that disclosed in U.S. Patent No. 3,122,370 and having their upper and lower ends connected to tube sheets 23 and 30, respectively.

Liquid sodium is supplied to vessel 10 by conduits 43 extending through head 14 in sealing relationship therewith and connected to a ring-shaped header 44 from which depend distribution nozzles 46 arranged for discharge below the sodium level of vessel 10.

The control system for the vapor generator includes a controller 50 connected by pipe 52 to space 16 to measure pressure. A conduit 60, controlled by a valve 62, is connected for supply of nitrogen to chamber 22 from a tank, not shown, in the event of a tube rupture or leak. Control lines 64, 66, 68 and 70 respectively connect valves 25, 36, 40 and 62 to controller 50 to implement its action.

In accordance with the invention each tube 42 has its inlet and outlet ends respectively fitted with asymmetric venturi-shaped flow control resistors 48A and 48B. While the use of flow resistors in tubular heat exchangers is well known for providing stabilized and uniform flow in parallel flow tubes, the design of such resistors is based on fluid flow in one direction only. The resistors of the invention are so constructed and arranged that during normal operation the fluid pressure drop at the inlets of tubes 42 is relatively high to assure stable and uniform flow through the tubes, while the pressure drop at the outlets of such tubes is as low as possible; and that upon tube rupture, with flow direction reversed, the inlet pressure drop is as low as possible to permit rapid efflux of water from the tube bundle, while outlet pressure drop is high to minimize reentry of steam into the rupture tube and thus minimize the sodium-water reaction.

Each resistor comprises two truncated cones, one short and the other relatively long and called the diffuser, connected at their small ends to provide a restricted throat portion. The resistors are constructed and arranged to take advantage of the pressure drop characteristics of a venturi nozzle. With a resistor oriented so that flow is from the short cone section to the diffuser, a portion of the available static pressure is converted to velocity head in the short cone section and the throat. This velocity head is efficiently converted back to static pressure in the gradually expanding diffuser resulting in a minimum overall pressure drop in this flow direction. With flow in the reverse direction, pressure is converted to velocity in the diffuser and throat, but the sharply diverging short cone section prevents efficient conversion of velocity back to pressure. Consequently, the pressure drop in such reverse flow direction is many times greater than with flow in the opposite direction.

In application, tubes 42 have identical inlet and outlet resistors, each tube having its resistors positioned so that the large ends of the short cone sections face each other. With this arrangement the inlet resistors afford a higher restriction in the normal direction of secondary fluid flow than when flow is in the opposite direction. This inlet resistor characteristic provides high pressure drop in the normal direction of secondary fluid flow, thus promoting uniform and stabilized flow in the parallel flow tubes, and a relatively low pressure drop in the reverse flow direction when discharging water or flashed steam to the dump tank after a tube rupture. This same principle, but in reverse, is utilized in respect to the resistors in the tube outlets. The tube outlet resistors provide a relatively low restriction in the normal secondary fluid flow direction and a high pressure drop in the reverse flow direction after a tube rupture.

In normal operation, secondary fluid, preferably water at a pressure substantially greater than that of the primary fluid, supplied by a pump, not shown, passes through conduit 34 to inlet chamber 32, then flows in parallel through tubes 42 to outlet chamber 22, and then discharges through conduit 24 to a point of use. Fluid pressure drop through the tube outlet resistors is about one tenth of the fluid pressure drop through the tube inlet resistors.

Pressurized primary fluid, sodium in the embodiment described, after removing heat generated by the fission reaction in the core of a nuclear reactor, not shown, flows through inlet conduits 43, header 44, and distributors 46 to the sodium space of vessel 10, then flows through the vessel to outlet 28 while passing over and between tubes 42 in indirect heat transfer relation with the secondary fluid flowing through such tubes, and then is directed back to the core to complete the cycle. Meanwhile, valves 36 and 25 are open and valves 40 and 62 are closed. The arrows of FIGS. 1 and 1A point in the direction of water and sodium flow.

Figure 2:
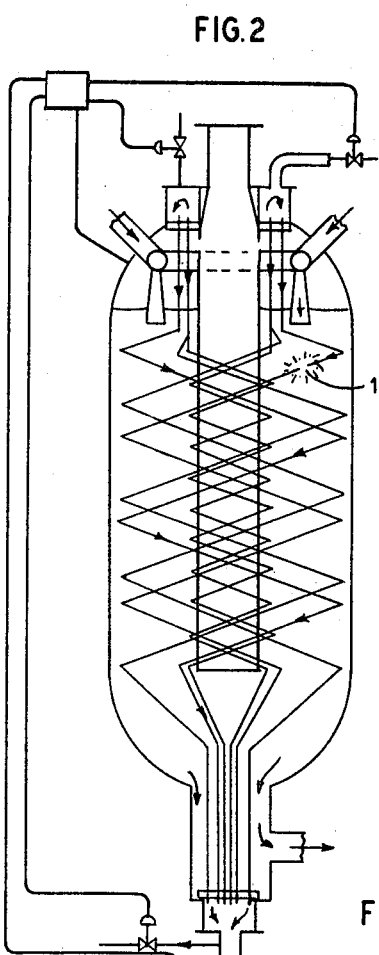
FIG. 2 shows the vapor generator of FIG. 1 with a tube failure, and indicating the resulting change in the heated fluid flow path.
Figure 2A:
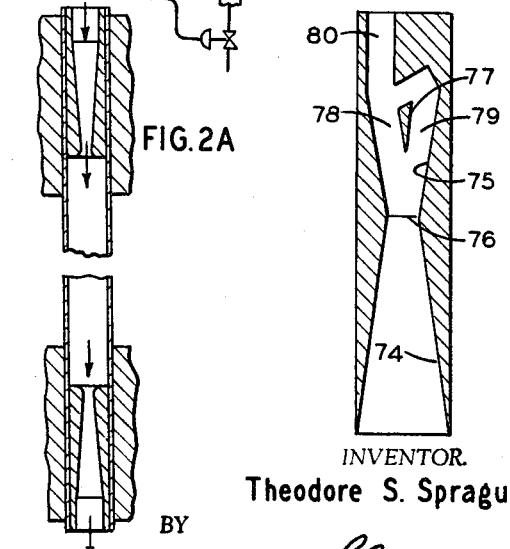
FIG. 2A is a sectional view of the same character as FIG. 1A except for reversal of flow direction of the heated fluid.

FIGS. 2 and 2A show the same vapor generator construction described above except that a complete tube rupture has occurred as indicated at point 1 and the flow arrows in the tubes show the change in flow direction which takes place immediately after the tube rupture. The heat developed and the hydrogen generated by reaction of the sodium with secondary fluid discharging from the ruptured tube raises the pressure in the vessel. Controller 50 automatically and continuously measures pressure in space 16 by way of pipe 52 and translates the pressure build-up due to the sodium-water reaction into an impulse, which is transmitted through lines 64, 66, 68 and 70 to close valves 25 and 36 and open valves 40 and 62. In the event of still further pressure build-up, disc 20 is set to rupture at about 50 p.s.i. above the energization pressure of controller 50 to allow the product of the sodium-water reaction to escape by way of openings 21 into conduit 18. When valve 62 is opened, nitrogen, at a pressure substantially higher than the pressure in vessel 10, starts flowing into chamber 22 to purge tubes 42, including the ruptured tube, by forcing the secondary fluid to drain through conduit 38 until the entire tube bundle is filled with nitrogen gas. After the sodium has cooled down, it can be drained away to allow repair of the ruptured tube.

During the time interval between the tube rupture and the completion of the purging operation, the asymmetric flow resistors minimize the discharge of water into the sodium and thereby minimize the sodium-water reaction. When valves 25 and 36 are closed and valve 40 is opened, flow is reversed in tubes 42. The flow in the ruptured tube is shown in FIG. 2A. The flow through the inlet resistor of such tube is reversed in the direction of the dump tank via conduit 38. Therefore water is drawn away from the tube break. Flow through the outlet resistor of the ruptured tube is also reversed in the direction of the tube break. The result is that, owing to the high flow resistance in the reverse flow direction provided by the diffuser portion of each tube outlet resistor, the discharge of water from the ruptured tube into the sodium is reduced to about one quarter of the amount that would be discharged if there were no tube outlet resistors installed. For a given pressure drop the reversed flow through the inlet resistors will be approximately four to five times greater than the reversed flow through the outlet resistors at the same of tube rupture.

By way of example and not of limitation, each of the resistors of the above described embodiment has two truncated cone portions connected at their small ends in such manner as to provide a smooth transition from one to the other with no intervening section of constant throat diameter. The minimum throat diameter is $9/32''$, the length, included angle and large end diameter of one cone being $13/32''$, 90° and .85'', respectively, the corresponding figures for the other cone being $3^{11}/_{16}''$, 10° and .72''. Tests have demonstrated that such a resistor provides a resistance in the high-resistance flow direction about five times greater than the resistance in the reverse low-resistance flow direction.

Figure 3:
FIG. 3 shows a modification of the resistors of FIG. 1A.
Figures 1A, 4:
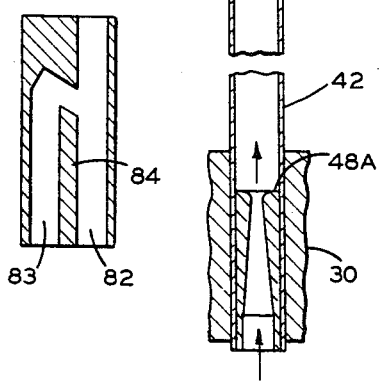
FIG. 1A is a sectional view showing the inlet and outlet resistors of a tube of FIG. 1.
FIG. 4 illustrates another modification of the resistors of FIG. 1A.

Although the above description relates to a particular form of flow resistor, it will be understood that other forms of resistors may be utilized, and that the inlet and outlet resistors need not be identical in configuration, the essential requirements being that the tube inlet resistors provide relatively high pressure drop in the normal flow direction and relatively low pressure drop in the reverse flow direction and that the tube outlet resistors have pressure drop characteristics opposite to those of the inlet resistors. Modified forms of resistors that may be employed are shown in FIGS. 3 and 4. The resistor of FIG. 3 is of the self-interference type and has two truncated cone portions 74 and 75 connected at their small ends to form throat 76, with cone 75 having a flow divider 77 to provide two parallel flow tubular passages 78 and 79 each opening to a tubular passage 80 having its flow axis arranged parallel to and to one side of the flow axis of cone 74. With the resistor oriented for high restriction to flow, passage 78 is arranged to discharge fluid into passage 80 at an obtuse angle slightly less than 180° relative to the flow axis of passage 80, while passage 79 discharges fluid to passage 80 at an acute angle somewhat less than 90° relative to the flow axis of passage 80 to provide interference with the outflow of passage 78 and consequent relatively high pressure drop. Flow in the reverse direction through such resistor provides relatively low pressure drop. Thus this modified form of resistor has pressure drop characteristics similar to those of the resistors of the FIG. 1 embodiment. In application each tube has its inlet and outlet resistors positioned so that passages 80 face each other.

The resistor of FIG. 4 is also of the self-interference type and comprises two parallel flow tubular passages 82 and 83 separated by a flow divider 84, with passage 82 extending the full length of the resistor and passage 83 extending along about two-thirds the length of the resistor and opening to passage 82. With such resistor oriented for high restriction to flow, passage 83 discharges fluid to passage 82 at an acute angle somewhat less than 90° relative to the flow axis of passage 82 to provide interference with flow through passage 82 and consequent high pressure drop. Flow in the opposite direction through a resistor of this form affords relatively low pressure drop. Resistors of this type should be positioned in the inlet and outlet of each tube so that the single opening ends face each other.

While in accordance with the provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features.

What is claimed is:

1. In a fluid heating unit, a pressure vessel, a plurality of tubes in said vessel arranged for parallel flow of fluid therethrough, means flowing primary fluid through the vessel and over the tubes, means flowing a vaporizable secondary fluid through the tubes in indirect heat absorbing relation with the primary fluid, means for cutting off fluid supply to said tubes in the event of a tube failure, means for reversing the direction of fluid flow in said tubes in the event of a tube failure and for draining the tubes upon such flow reversal, and a flow resistor in the inlet and outlet portions of each tube, each tube inlet resistor being proportioned and arranged to provide a substantial secondary fluid pressure drop in the normal secondary fluid flow direction to promote stable and uniform flow through the tubes and a relatively low pressure drop in the reverse flow direction to permit rapid drainage of secondary fluid from the tubes in the event of tube failure, each tube outlet resistor being proportioned and arranged to provide a relatively low secondary fluid pressure drop in the normal secondary fluid flow direction and a substantial secondary fluid pressure drop in the reverse flow direction in the event of tube failure to minimize flow in the direction of the tube fault.

2. In a fluid heating unit according to claim 1, wherein the primary fluid is a liquid alkali metal.

3. In a fluid heating unit according to claim 1, wherein each tube inlet resistor is in the form of a venturi tube.

4. In a fluid heating unit according to claim 3, wherein each tube outlet resistor is in the form of a venturi tube.

5. In a fluid heating unit according to claim 1, wherein the tube inlet and outlet resistors are identical in configuration and proportions.

References Cited
UNITED STATES PATENTS

| | | | |
|---|---|---|---|
| 3,098,023 | 7/1963 | Schluderberg | 165—70 X |
| 3,168,136 | 2/1965 | Ammon | 165—70 |

KENNETH W. SPRAGUE, *Primary Examiner.*